US012771115B2

(12) United States Patent
Du et al.

(10) Patent No.: US 12,771,115 B2
(45) Date of Patent: Oct. 20, 2026

(54) METHOD AND APPARATUS FOR DIFFERENTIAL PROTECTION OF PROTECTION SECTION, RELAY PROTECTION DEVICE

(71) Applicant: Schneider Electric Industries SAS, Rueil-Malmaison (FR)

(72) Inventors: Wansen Du, Shanghai (CN); Xinrong Ni, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 164 days.

(21) Appl. No.: 18/780,022

(22) Filed: Jul. 22, 2024

(65) Prior Publication Data

US 2025/0047092 A1 Feb. 6, 2025

(30) Foreign Application Priority Data

Jul. 31, 2023 (CN) ........................ 202310957995.X

(51) Int. Cl.
*H02H 3/28* (2006.01)
*H02H 7/26* (2006.01)

(52) U.S. Cl.
CPC .............. *H02H 3/283* (2013.01); *H02H 3/28* (2013.01); *H02H 7/26* (2013.01)

(58) Field of Classification Search
CPC . H02H 3/283; H02H 7/0455; H02H 7/26–263
See application file for complete search history.

(56) References Cited

U.S. PATENT DOCUMENTS

2015/0293166 A1* 10/2015 Mieske .................. G01R 31/40 702/59
2015/0349511 A1* 12/2015 Kojovic ................. G01R 31/40 324/764.01

(Continued)

FOREIGN PATENT DOCUMENTS

CN 104466903 A 3/2015
CN 106058804 A 10/2016

OTHER PUBLICATIONS

Extended European Search Report dated Jan. 28, 2025 for corresponding European Patent Application No. 24306261.9, 8 pages.

*Primary Examiner* — Thienvu V Tran
*Assistant Examiner* — Christopher J Clark
(74) *Attorney, Agent, or Firm* — FIG. 1 Patents

(57) ABSTRACT

A differential protection method for a protection section of a power system is disclosed. The differential protection method includes: obtaining a first secondary current value of a first current transformer and a second secondary current value of a second current transformer; determining a differential current value and a braking current value; opening a judgment window in response to an occurrence of a fault in the power system, in response to the differential current value and the braking current value satisfying an in-section fault condition during the judgment window, judging the fault as an in-section fault, otherwise judging the fault as a fault to be determined. Furthermore, an apparatus for differential protection of a protection section of a power system and a relay protection device are disclosed.

9 Claims, 4 Drawing Sheets

(56) References Cited

U.S. PATENT DOCUMENTS

| | | | | |
|---|---|---|---|---|
| 2016/0149390 | A1* | 5/2016 | Donolo | H02H 3/093<br>322/27 |
| 2019/0067928 | A1 | 2/2019 | Kerger et al. | |
| 2021/0273442 | A1* | 9/2021 | Kerger | H02H 1/0007 |

* cited by examiner

METHOD AND APPARATUS FOR DIFFERENTIAL PROTECTION OF PROTECTION SECTION, RELAY PROTECTION DEVICE

TECHNICAL FIELD

The present disclosure relates to the field of relay protection, in particular to a method and an apparatus for differential protection of a protection section of an electric power system and a relay protection device.

BACKGROUND

Power systems play an important role in people's daily lives. For example, when a fault occurs in a power element (e.g., generator, line, etc.) in the power system, jeopardizing the safe operation of the power system, a warning signal is promptly issued using relay protection or a trip command is issued directly to a controlled circuit breaker to disconnect the faulted section from the power system. Differential protection is a commonly used way of relay protection, which judges whether there is a fault in the protection section by detecting an imbalance in the current of the protection section, so as to perform a corresponding action.

The monitoring and protection of power systems is often accomplished with the help of current transformers, which use induced secondary currents to reflect primary current conditions. However, in the case where a fault current caused by a fault occurs, the core of the current transformer may reach saturation due to excessive magnetic flux density, resulting in a large transfer error of the current transformer, a large decrease in the accuracy of the induced secondary current, and a large decrease in the reliability of the determination result when the differential protection makes a fault judgment with the help of the current transformer at both ends of the protection section. Currently, with the continuous development of the power system, the level of short-circuit current in the event of a fault continues to increase, and a number of protective malfunction accidents due to saturation of the current transformer occur.

SUMMARY

To solve the above problems, a method and an apparatus for differential protection of a protection section of a power system, a relay protection device, and a computer-readable storage medium according to the present disclosure are capable of achieving higher reliability differential protection in the presence of a possibility that a current transformer has saturated.

Embodiments of the present disclosure provide a differential protection method for a protection section of a power system, two ends of the protection section are respectively connected a first current transformer and a second current transformer, the differential protection method includes: continuously obtaining a first secondary current value of the first current transformer and a second secondary current value of the second current transformer; determining a differential current value and a braking current value based on the first secondary current value and the second secondary current value; and opening a judgment window in response to an occurrence of a fault in the power system, in response to where the differential current value and the braking current value satisfying an in-section fault condition during the judgment window, judging the fault as an in-section fault, otherwise judging the fault as a fault to be determined, wherein the in-section fault condition is that the absolute value of the differential current value is consistently greater than the absolute value of the braking current value, and the absolute value of the differential current value is monotonically increasing.

According to an embodiment of the present disclosure, the judgment window lasts from 3 ms to 5 ms.

According to an embodiment of the present disclosure, in response to the fault being judged to be the in-section fault, controlling circuit breakers arranged at both ends of the protection section to perform a protection action such that the protection section is disconnected from the power system.

According to an embodiment of the present disclosure, in response to the fault being judged to be the fault to be determined, blocking a protection action in a predetermined period such that the protection section is not disconnected from the power system in the predetermined period.

According to an embodiment of the present disclosure, performing a subsequent fault judgment in the predetermined period, and upon expiration of the predetermined period, determining whether to allow a protection action, wherein the subsequent fault judgment includes determining a type of the fault using harmonic braking.

Embodiments of the present disclosure provide a relay protection device capable of providing differential protection for a protection section of a power system, the protection section including a first current transformer and a second current transformer connected at each end of the protection section, the relay protection device includes: a current obtaining module for continuously obtaining a first secondary current value of the first current transformer and a second secondary current value of the second current transformer; a determination module for determining a differential current value and a braking current value based on the first secondary current value and the second secondary current value; and a judgment module for opening a judgment window in response to an occurrence of a fault in the power system, and in response to the differential current value and the braking current value satisfying an in-section fault condition during the judgment window, judging the fault as an in-section fault, otherwise judging the fault as a fault to be determined; wherein the in-section fault condition is that the absolute value of the differential current value is consistently greater than the absolute value of the braking current value, and the absolute value of the differential current value is monotonically increasing.

According to an embodiment of the present disclosure, the relay protection device further including: a control module, in response to the fault being judged to be the in-section fault, the control module is configured to control circuit breakers arranged at both ends of the protection section to perform a protection action such that the protection section is disconnected from the power system, in response to the fault being judged to be the fault to be determined, the control module is configured to block a protection action in a predetermined period such that the protection section is not disconnected from the power system in the predetermined period.

According to an embodiment of the present disclosure, in response to the fault being judged as the fault to be determined, the judgment module performs a subsequent fault judgment in the predetermined period, and determines whether to allow a protection action upon expiration of the predetermined period, wherein the subsequent fault judgment includes determining a type of the fault using harmonic braking.

Embodiments of the present disclosure provide an apparatus for differential protection of a protection section of a power system, including: at least one processor; and at least one memory in which is stored an executable program which, when the executable program is executed by the at least one processor, performs a method according to one of the embodiments of the present disclosure.

Embodiments of the present disclosure provide a computer-readable storage medium in which are stored computer-readable commands which, when executed by a processor, implement a method according to one of the embodiments of the present disclosure.

Embodiments of the present disclosure provide a computer program product or computer program including computer commands stored in a computer-readable storage medium. At least one processor of the computer device reads the computer commands from the computer readable storage medium, the at least one processor executes the computer commands, so that the computer device performs the method according to one of the embodiments of the present disclosure.

BRIEF DESCRIPTION OF DRAWINGS

In order to illustrate the technical scheme of the embodiments of the present disclosure more clearly, the accompanying drawings required to be used in the description of the embodiments will be briefly described below. Obviously, the accompanying drawings in the description below are only exemplary embodiments of the present disclosure, and other accompanying drawings can be obtained according to these accompanying drawings without creative work for persons having ordinary skill in the art.

DETAILED DESCRIPTION

Figure 1:
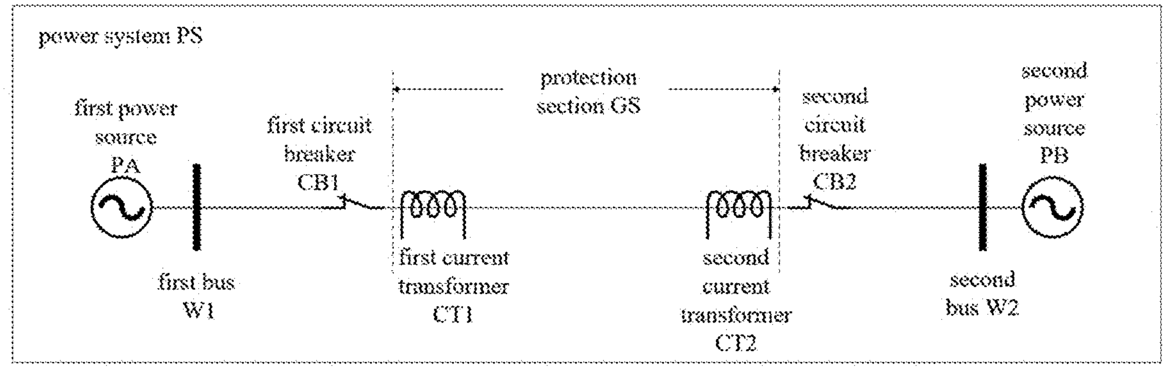
FIG. 1 illustrates a schematic diagram of a power system according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In the present specification and the accompanying drawings, substantially same or similar steps and elements are represented by the same or similar reference numerals, and repeated descriptions of these steps and elements will be omitted. Meanwhile, the terms "first," "second," etc., which are used in the description and the claims of the present application for disclosure, are not intended to indicate any sequence, amount or importance, but for distinguishing various components.

Unless otherwise defined, all technical and scientific terms used herein have the same meanings as commonly understood by those skilled in the art of the present disclosure. The terms used herein are only for the purpose of describing the embodiments of the disclosure and are not intended to limit the disclosure.

To facilitate the description of the present disclosure, concepts related to the present disclosure are introduced below.

Saturation of current transformers: Current transformers are based on the principle of electromagnetic induction, in that when a varying current flows on the primary side, a varying magnetic flux is induced on the iron core of the current transformer, which in turn induces a secondary current on the secondary side. In normal operation, the core in the current transformer is normally in an unsaturated state. When a fault such as a short circuit occurs, the fault current flowing through the primary side is excessively large, causing the magnetic flux density of the core to increase and reach saturation, the magnetic field strength change is no longer noticeable, the secondary current is distorted and does not properly reflect the primary current, and a large transfer error occurs in the current transformer.

In-section Fault: The point of fault occurs within the protected section.

Out-of-section Fault: The point of fault occurs outside the protected section.

Differential protection: A local protection for a protection section of a power system, based on a comparison of the currents across the protection section. Differential protection is based on Kirchhoff's current law, in the event of an in-section fault of a protection section, the current across the protection section deviates significantly from equilibrium. The differential protection takes place by means of current transformers across the protection section.

Differential current: One of the parameters used in differential protection, also known as imbalance current, is mathematically defined as the vector sum of the secondary currents induced by the current transformers at the ends of the protected section.

FIG. 1 illustrates a schematic diagram of a power system according to an embodiment of the present disclosure.

As shown in FIG. 1, the power system PS is, for example, a dual power source Power system. The dual supply power system includes a first power source PA, a second power source PB of alternating current. The current flow direction is determined by a specific electric potential situation in the operation of the power system.

A protection section GS requiring differential protection is connected between a first bus W1 on the side of the first power source PA and a second bus W2 on the side of the second power source PB. Protected objects of a protected section of a power system include, for example, lines, transformers, busbars, generators, motors, and the like.

A first current transformer CT1 and a second current transformer CT2 are connected at both ends of the protection section GS, which are included in the protection section for reflecting a primary current situation between the first power source PA, the second power source PB. A first circuit breaker CB1 and a second circuit breaker CB2 are arranged at both ends of the protection section GS for performing a protection action when the differential protection method determines an in-section fault, i.e. disconnecting the protection section GS from the power system PS, reducing the operation time under the fault current, and reducing the degree of damage of the protected object.

As described above, the current transformer may be saturated due to a fault primary current, so that the induced secondary current can no longer correctly reflect the primary current situation, and the reliability of the fault judgment result is reduced.

Figure 2:
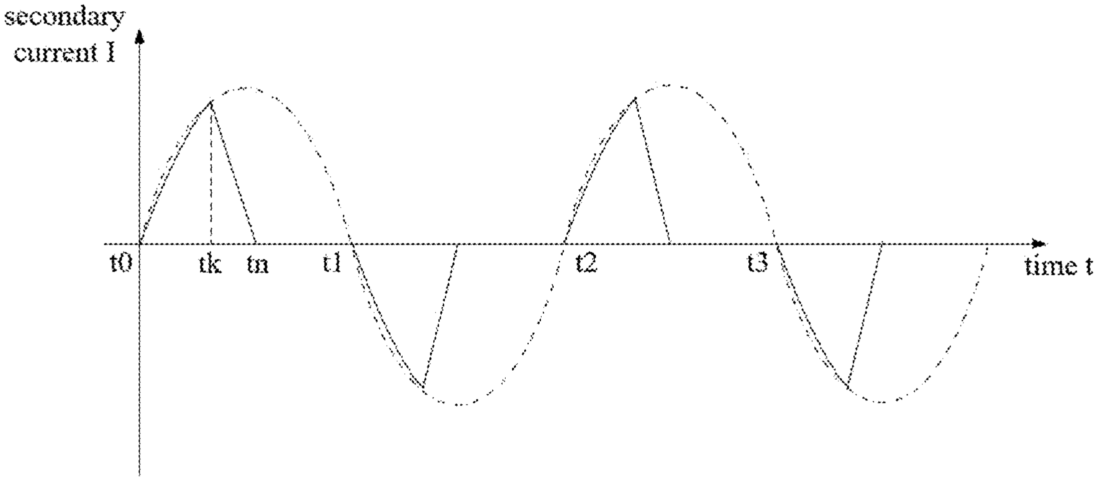
FIG. 2 schematically illustrates a current curve over time of a current transformer.

The effect of the saturation of the current transformer on the induced secondary current is exemplarily explained below with FIG. 2. FIG. 2 schematically illustrates a current curve of a current transformer over time.

As shown in FIG. 2, the horizontal axis represents the time t, the vertical axis represents the induced secondary current I, and the current curve of the induced secondary current over time in the ideal case is shown by a dashed-dotted line, and the current curve of the induced secondary current over time in the case where saturation of the current transformer occurs is shown by a solid line.

The time points t0, t1, t2, t3 represent the alternating current flowing through the zero point. Ideally, the current transformer transfers accurately, and the current curve of the induced secondary current exhibits the same waveform as the primary current. On the contrary, in the case where the current transformer is gradually saturated due to the fault current, taking the half cycle of t0 to t1 as an example, in the period from the crossing zero point t0 to the saturation time point tk, the current transformer is not saturated and transfers substantially accurately, but due to, for example, the measurement error of the current transformer itself, the induced secondary current curve does not fully conform to the ideal curve, but is closer to the linear curve, and this phase is called the linear transfer stage. After saturation time point tk, the induced secondary current appears distorted, falling rapidly and decreasing to 0 at time point tn. In other words, after saturation of the current transformer occurs, the faulty primary current is large, while the secondary current used to reflect the primary current is rapidly reduced to even 0, and the current transformer cannot accurately transfer the transformations.

Therefore, in the event of a fault, the current transformer may already be saturated, and the reliability of fault judgment based on the secondary current is reduced.

Figure 3A:
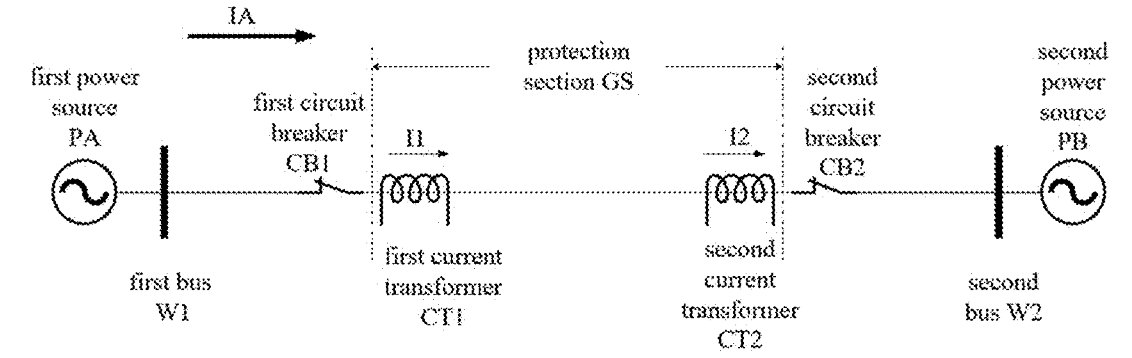
FIG. 3A exemplarily illustrates a schematic current situation of the power system according to FIG. 1 in normal operation.

FIG. 3A exemplarily illustrates a schematic current situation of the power system according to FIG. 1 in normal operation.

As shown in FIG. 3A, for example, the primary current IA flows through the protection section GS in a direction from the first power source PA to the second power source PB. The first current transformer CT1 and the second current transformer CT2 of the protection section GS respectively induce a first secondary current I1 and a second secondary current I2 in the same direction as the primary current IA.

According to Kirchhoff's current law, the sum of the currents entering the protection section GS is equal to the sum of the currents leaving the protection section GS. Entering the protection section GS is the positive direction of the current. This results in that, in the ideal case, the vector sum, i.e. the differential current, of the first secondary current I1 and the second secondary current I2 is zero.

For example, the magnitude of the normal primary current IA is 100 A, the magnitude of the measured first secondary current I1 and second secondary current I2 is 5 A, $\dot{I}1=5$ A, $\dot{I}2=-5$ A, $\dot{I}1+\dot{I}2=0$, considering the directivity of the current.

In normal operation, the current transformer is usually not saturated. However, for example due to manufacturing accuracy problems of the current transformer itself, there is a certain error in the measurement results of the current transformer, with an error interval of, for example, −2% to +2%. Thus, in the above example, the first secondary current I1 and the second secondary current I2 lie, for example, in the intervals of 4.9 A to 5.1 A and −4.9 A to −5.1 A, respectively, and the magnitude of the vector sum thereof, i.e. the absolute value of the differential current, lies in the interval of 0 to 0.2 A.

Figure 3B:
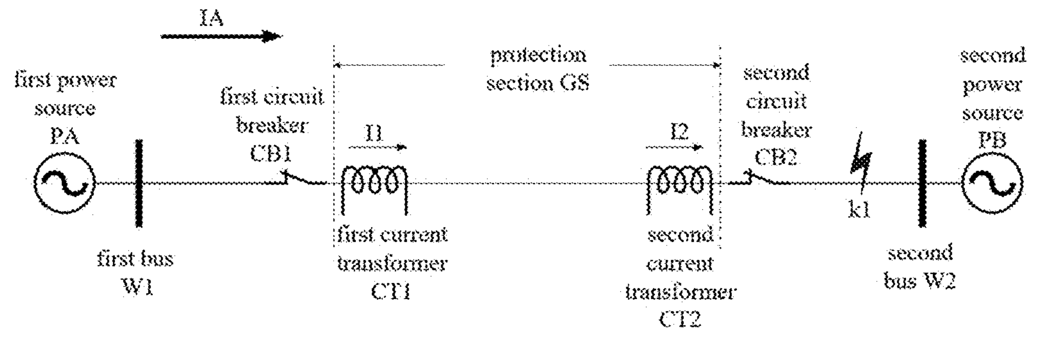
FIG. 3B exemplarily illustrates a schematic current situation of the power system according to FIG. 1 when an out-of-section fault occurs.

FIG. 3B exemplarily illustrates a schematic current situation of the power system according to FIG. 1 when an out-of-section fault occurs.

As shown in FIG. 3B, a fault point kl occurs in a section between the protection section GS and the second power source PB, that is, an out-of-section fault occurs. In the event of a fault, the electric potential at the fault point is lowest and current flows from the power source to the fault point. Therefore, on the left side of the fault point kl, the failed primary current IA flows through the protection section GS in a direction from the first power source PA toward the second power source PB. The first current transformer CT1 and the second current transformer CT2 of the protection section GS respectively induce a first secondary current I1 and a second secondary current I2 in the same direction as the primary current IA.

For example, the fault primary current IA is 1000 A, in the case where neither the first current transformer CT1 nor the second current transformer CT2 is saturated and capable of accurate transfer, $\dot{I}1=50$ A, $\dot{I}2=-50$ A, $\dot{I}1+\dot{I}2=0$.

In the case of considering the measurement error of the current transformer itself without considering the saturation of the current transformer, also assuming that the current transformer has an error interval of, for example, −2% to +2%, the first secondary current I1 and the second secondary current I2 lie in the interval of 49 A to 51 A and −49 A to 51 A, respectively, and the magnitude of the vector sum thereof, i.e. the absolute value of the differential current, lies in the interval of 0 to 2 A.

In the case where saturation of the at least one current transformer is considered, the first secondary current I1 and/or the second secondary current I2 has been distorted, resulting in that the vector sum, i.e. the differential current, may deviate severely from zero.

Figure 3C:
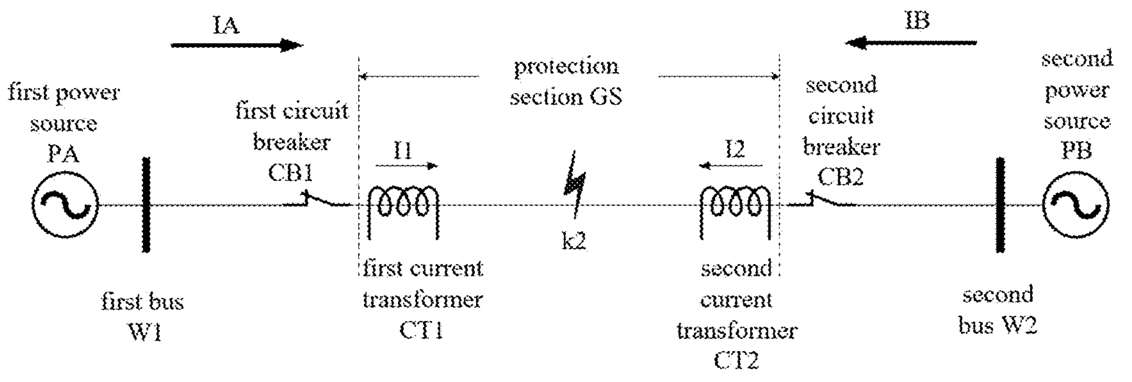
FIG. 3C exemplarily illustrates a schematic current situation of the power system according to FIG. 1 when an in-section fault occurs.

FIG. 3C exemplarily illustrates a schematic current situation of the power system according to FIG. 1 when an in-section fault occurs.

As shown in FIG. 3C, a fault point k2 occurs within the protection section GS, i.e., an in-section fault occurs. On the left side of the fault point k2, the faulty primary current IA flows from the first power source PA to the fault point k2, i.e. into the protection section GS, and on the right side of the fault point k2, the faulty primary current IB flows from the second power source PB to the fault point k2, i.e. into the protection section GS. The faulty primary current IA and the faulty primary current IB are not necessarily equal. The current directions of the first secondary current I1 and the second secondary current I2 induced by the first current transformer CT1 and the second current transformer CT2, respectively, are positive.

For example, the faulty primary current IA and the faulty primary current IB are each 1000 A, in the case where the first current transformer CT1 and the second current transformer CT2 are not saturated and can accurately transfer, $\dot{I}1$=50 A, $\dot{I}2$=50 A, $\dot{I}1+\dot{I}2$=100 A.

In the case of considering the measurement error of the current transformer itself without considering the saturation of the current transformer, also assuming that there is an error interval of, for example, −2% to +2% of the current transformer, the first secondary current I1 and the second secondary current I2 lie in the interval of 49 A to 51 A and 49 A to 51 A, respectively, the magnitude of the vector sum thereof, i.e. the absolute value of the differential current, lies in the interval of 98 A to 102 A.

Under consideration that saturation of the at least one current transformer may occur, the first secondary current I1 and/or the second secondary current I2 have been distorted, the magnitude of the vector sum of which may deviate severely from 100 A.

In connection with the examples according to FIG. 3A, FIG. 3B, FIG. 3C, in the event of an in-section fault of the protection section GS, the first secondary current I1 and the second secondary current I2 deviate significantly from equilibrium, manifesting as a significant deviation of the differential current from zero.

A known differential protection method is to determine that the fault is an in-section fault when the absolute value of the differential current is greater than a predetermined threshold value.

However, as can be seen from the above description, judging the in-section fault with the judgment condition that the absolute value of the differential current is greater than the predetermined threshold value has the following defects:

The current transformer itself has an error, and in the case where the normal primary current in the power system is large or a faulty primary current occurs, the induced secondary current and its error also become large. For example, when the predetermined threshold value is 1 A, taking as an example that the magnitude of the vector sum of the first secondary current I1 and the second secondary current I2 described with reference to FIG. 3B may lie in the range of 0 to 2 A, the judgment condition misjudges the out-of-section fault as an in-section fault and incorrectly carrying out the protection action. Conversely, when the predetermined threshold is set too high, a situation may occur in which the in-section fault is missed and result in the protection action not being performed.

Therefore, another known differential protection method introduces a new in-section fault condition based on the braking current.

The braking current is set as the product of the proportional braking coefficient K and the vector difference $\dot{I}1-\dot{I}2$ of the first secondary current I1 and the second secondary current I2, i.e. K*($\dot{I}1-\dot{I}2$). The proportional braking coefficient K is chosen as desired, for example between 0.5 and 0.8. The new in-section fault condition of the differential protection method is that the absolute value of the differential current is greater than the absolute value of the braking current. In the case of an in-section fault of the electric power system, the currents of the first secondary current and the second secondary current are the same positive and negative, the absolute value of the braking current is smaller and the braking effect is smaller, so that the in-section fault condition can be satisfied and a protection action is triggered, and conversely, in the case of a normal operation or an out-of-section fault, the currents of the first secondary current and the second secondary current are opposite in positive and negative, the absolute value of the braking current is larger and the braking effect is larger, so that the differential current, even if higher than a certain threshold, is still within the braking range of the braking current, cannot meet the in-section fault condition, so that a protection action is not triggered. The new in-section fault condition is no longer standardized on a fixed predetermined threshold, but is based on a dynamic braking current that also varies with the first secondary current and the second secondary current, increasing the reliability of the in-section fault judgment.

However, this differential protection method based on proportional braking is only able to guarantee the reliability of the current transformer within a certain error range, for example +/−10%. When, for example, the current transformer is saturated or even severely saturated due to excessive fault currents, exceeding or even severely exceeding the error interval, this differential protection method based on proportional braking is not able to reliably ensure that the protection action will not be performed incorrectly.

Figure 4:
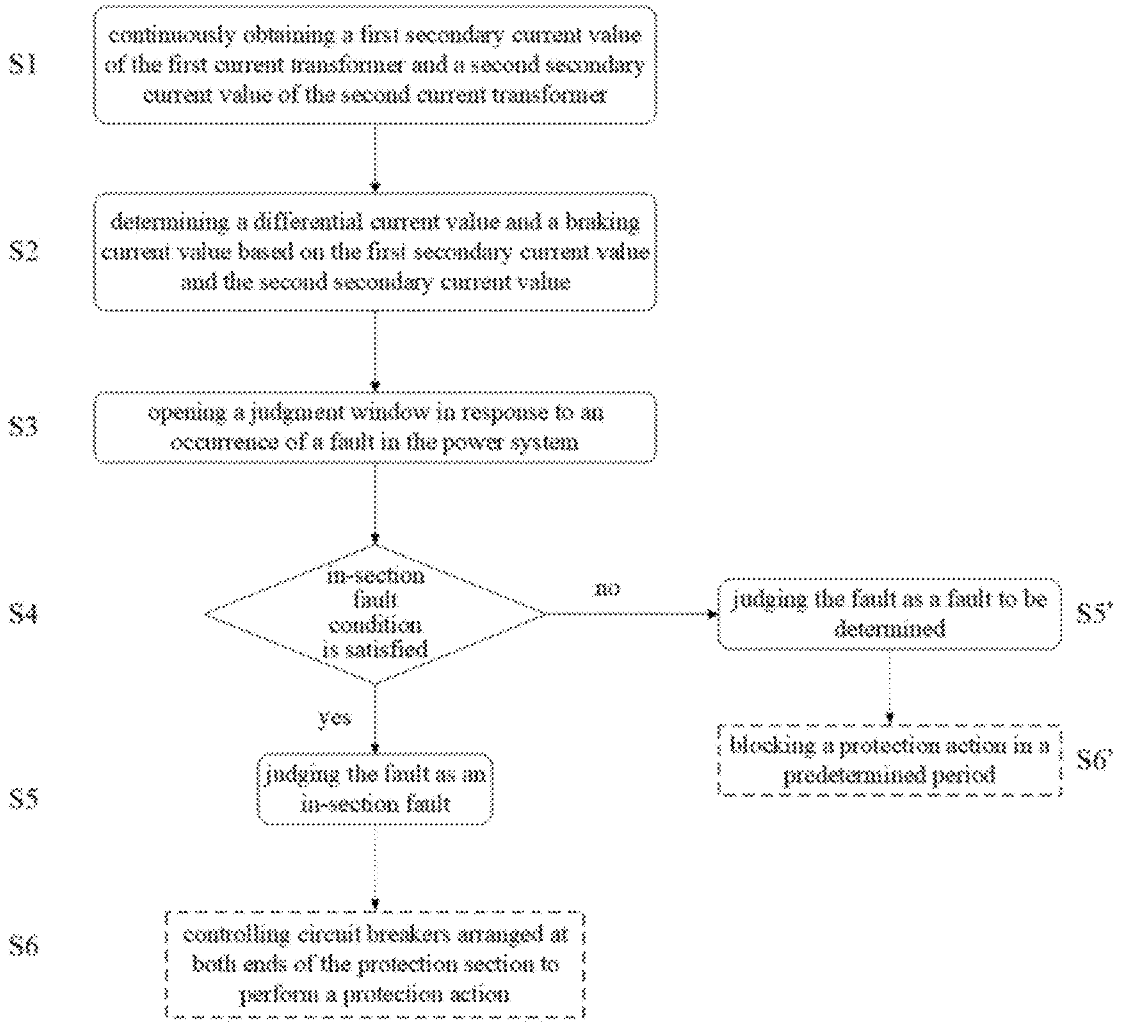
FIG. 4 schematically illustrates a flow chart of a differential protection method for a protection section of a power system according to an embodiment of the present disclosure.

FIG. 4 schematically illustrates a flow chart of a differential protection method for a protection section of a power system according to an embodiment of the present disclosure.

In a first step S1, a first secondary current value I1 of a first current transformer and a second secondary current value I2 of a second current transformer are continuously obtained. The first step S1 is carried out, for example, by means of a current detection unit of a current transformer.

In a second step S2, a differential current value $\dot{I}1+\dot{I}2$ and a braking current value K*($\dot{I}1-\dot{I}2$) are determined based on the first secondary current value I1 and the second secondary current value I2. As described above, the differential current value reflects the current balance between the two ends of the protection section, and in normal operation of the power system, the differential current value is substantially zero.

In a third step S3, the judgment window is opened in response to a fault of the power system. Fault of the power system is manifested, for example, by an induced secondary current deviating from a normal range, or by an absolute value of the differential current value being greater than a certain predetermined threshold value. In this judgment window, it is determined whether the fault is an in-section fault.

In a fourth step S4, it is judged whether the differential current value and the braking current value satisfy the in-section fault condition during the judgment window. Wherein the in-section fault condition includes a first condition and a second condition, the first condition being: The absolute value of the differential current value $|\dot{I}1+\dot{I}2|$ is always greater than the absolute value of the braking current value $|K*(\dot{I}1-\dot{I}2)|$, the second condition being: the absolute value of the differential current value $|\dot{I}1+\dot{I}2|$ monotonically increases.

The first condition is based on proportional braking, and satisfaction of the first condition enables the fault to be judged as an in-section fault in the case where the current transformer transfers substantially accurately.

This second condition is based on the current curve according to the secondary current shown in FIG. 2 in the saturation condition of the current transformer. In the linear transfer phase before the current transformer is saturated, the current transformer transfers substantially accurately, and the reliability of the induced secondary current and the differential current and the braking current obtained based on the secondary current is high. In the case where an in-section fault occurs, in the linear transfer phase, the absolute value of the vector sum of the first secondary current and the second secondary current having the same current direction monotonically increases, that is, the absolute value of the differential current value monotonically increases.

Based on this, it can be judged whether the judgment window completely falls into the linear transfer stage, and if the judgment window completely falls into the linear transfer stage, the absolute value of the differential current value monotonically increases, i.e., the second condition is satisfied, the differential current value and the braking current value used in the first condition are regarded as accurate and the fault judgment result is regarded as reliable; If the judgment window does not completely fall into the linear transfer phase, but saturation of the current transformer has occurred in the judgment window, the absolute value of the differential current value is not monotonically increasing but fluctuates, i.e., the second condition is not satisfied, the differential current value and the braking current value used in the first condition are regarded as inaccurate, and the fault judgment result is regarded as unreliable.

The in-section fault condition according to the embodiment of the present disclosure assists in verifying the reliability of the first condition by the second condition, the in-section fault condition is satisfied only when the two conditions are satisfied at the same time, greatly improving the reliability of judging the in-section fault.

Advantageously, the duration of the judgment window is greater than or equal to 3 ms, preferably chosen between 3 ms and 5 ms, preferably 3 ms, 4 ms, 5 ms. In industry standards for current transformers for power systems, linear transfer times greater than 5 ms are generally required, at least to be able to meet greater than 3 ms.

The short duration of the judgment window is able to guarantee the accuracy of the judgment, and is advantageous for the differential protection method according to the embodiments of the present disclosure to achieve fast fault judgment and subsequent action execution. Even if a current transformer saturation situation occurs after the judgment window, the determination of the fault condition during the judgment window is still accurate.

In the case that the differential current value and the braking current value satisfy the in-section fault condition during the judgment window, the fault is judged to be an in-section fault in step S5, and the circuit breakers at both ends of the protection section are controlled to perform a protection action such that the protection section is disconnected from the power system in optional step S5' indicated by the dashed line. Controlling the circuit breakers at both ends of the protection section to perform the protection action for example includes transmitting a signal to perform the protection action to the circuit breakers, causing the circuit breakers to be disconnected.

In the case that the differential current value and the braking current value do not satisfy the in-section fault condition during the judgment window, the fault is determined as a fault to be determined in step S5', and the protection action is blocked for a predetermined period in optional step S6', which is represented by dashed lines, so that the protection section is not disconnected from the power system for the predetermined period. The predetermined period is, for example, 60 ms. In the case that the in-section fault condition is not met, for example the second condition is not met, the fault may be an in-section fault, an out-of-section fault, or there may be both an in-section fault and an out-of-section fault.

Optionally, in the case where the fault is determined as a fault to be determined, the fault to be determined can be determined as an out-of-section fault when the differential current value and the braking current value satisfy an out-of-section fault condition during the judgment window. Wherein the out-of-section fault condition can be that the absolute value of the differential current value is always less than the absolute value of the braking current value. In case an out-of-section fault is determined, a protection action for the protected section should not be triggered. However, out-of-section faults, such as short circuit currents, may also cause in-section faults.

Optionally, in a case where the fault is determined as a fault to be determined, a subsequent fault judgment can be performed according to a conventional fault judgment method in order to accurately identify whether or not there is a fault in the protection section. Subsequent fault judgment includes, for example, further analysis of the fault condition using harmonic braking.

By blocking the protection action for a predetermined period of time and further judging the fault situation, erroneous execution of the protection and refusal to execute the protection are favorably avoided, the accuracy of the differential protection is improved. Whether to allow the protection action is determined upon expiration of a predetermined time period. For example, in the case of an out-of-section fault, when the out-of-section fault has been removed by a corresponding out-of-section protective device within a predetermined period, a protection action may be allowed upon expiration of the predetermined period, enabling continued differential protection of the power system.

The in-section fault condition of the differential protection method according to the embodiment of the present disclosure specifically verifies the saturation situation of the current transformer by the second condition, solves the problem in the prior art that inaccurate secondary current values may be used for fault judgment, improves the accuracy, reliability of in-section fault judgment, effectively avoids incorrectly executing the action of the differential protection.

The differential protection method for a protection section of a power system according to embodiments of the present disclosure can for example be implemented separately for each phase of the power system.

Figure 5:
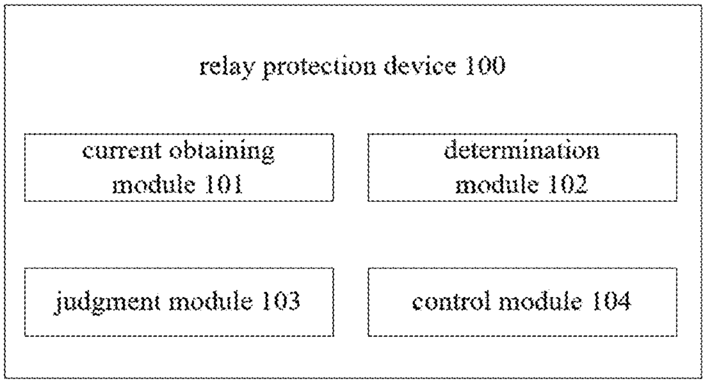
FIG. 5 illustrates a schematic diagram of a relay protection device according to an embodiment of the present disclosure.

FIG. 5 illustrates a schematic diagram of a relay protection device according to an embodiment of the present disclosure. The relay protection device 100 is capable of providing differential protection for a protection section of an electric power system, the protection section having first and second current transformers connected at both ends thereof, respectively.

As shown in FIG. 5, the relay protection device 100 has a current obtaining module 101, a determination module 102, a judgment module 103, and a control module 104.

The current obtaining module 101 is, for example, a current detecting device of a current transformer for continuously obtaining a first secondary current value of a first current transformer and a second secondary current value of a second current transformer.

The determination module 102 is configured to determine a differential current value and a braking current value based on the first secondary current value and the second secondary current value. The differential current value is the vector sum$\dot{I}1+\dot{I}2$ of the first and second secondary current values and the braking current value is the product $K*(\dot{I}1-\dot{I}2)$ of the proportional braking coefficient and the vector difference of the first and second secondary current values.

The judgment module 103 is used to open the judgment window in response to a fault occurring in the power system, in the case that the differential current value and the braking current value satisfy an in-section fault condition during the judgment window, judge the fault as an in-section fault, otherwise judge the fault as a to-be-determined fault. Wherein the in-section fault condition is that the absolute value of the differential current value $|\dot{I}1+\dot{I}2|$ is always greater than the absolute value of the braking current value $|K*(\dot{I}1-\dot{I}2)|$, and the absolute value of the differential current value $|\dot{I}1+\dot{I}2|$ is monotonically increasing. The satisfaction of the in-section fault condition, i.e., the simultaneous satisfaction of the first condition and the second condition, ensures that the fault judgment is performed at the linear transfer stage of the current transformer, improving the reliability of the determination result. In the case where the in-section fault condition is satisfied, the fault may be judged as an in-section fault and controlled to perform a protection action, and in the case where the in-section fault condition is not satisfied, further fault judgment is required.

The control module 104 is used for controlling whether to perform a protection action according to the fault judgment result. In case where the fault is judged to be an in-section fault, the control module 104 for example issues a command to cause circuit breakers arranged at both ends of the protection section to perform a protection action, thereby disconnecting the protection section from the power system. In the case where the fault is determined as a fault to be determined, the control module 104 blocks the protection action for a predetermined period so that the protective section is not disconnected from the power system for the predetermined period, avoiding erroneous execution of the protection action.

In the case where the fault is determined as the fault to be determined, the determination module 103 can additionally make a subsequent fault judgment in a predetermined period, and determine whether to allow the protection action upon expiration of the predetermined period. Wherein the subsequent fault judgment includes, for example, determining the type of the fault using harmonic braking.

The implementation and advantages of the differential protection method for a protection section of a power system according to embodiments of the present disclosure are equally applicable to the relay protection device according to embodiments of the present disclosure.

Figure 6:
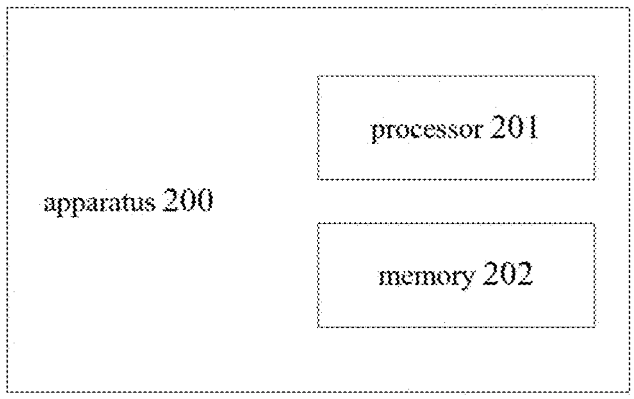
FIG. 6 illustrates a schematic diagram of apparatus for differential protection of a protection section of a power system according to an embodiment of the present disclosure.

FIG. 6 illustrates a schematic diagram of an apparatus 200 for differential protection of a protection section of a power system according to an embodiment of the present disclosure.

As shown in FIG. 6, an apparatus 200 for differential protection of a protection section of a power system includes one or more processors 201, and one or more memories 202. Therein, the memory 202 has stored therein an executable program which, when executed by the processor 201, performs the method as described above.

The processor in the embodiments of the present disclosure can be an integrated circuit chip, having processing capability of signals. The processor can be a general-purpose processor, a digital signal processor (DSP), an application specific integrated circuit (ASIC), an off-the-shelf programmable gate array (FPGA) or other programmable logic device, discrete gate or transistor logic, discrete hardware components. The methods, steps, and logical block diagrams disclosed in the embodiments of the present application can be implemented or performed. The general-purpose processor can be a microprocessor or the processor can be any conventional processor or the like and can be of an X86 architecture or an ARM architecture.

Figure 7:
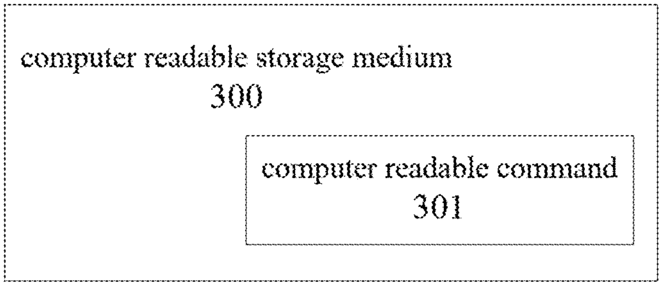
FIG. 7 illustrates a schematic diagram of a computer readable storage medium according to an embodiment of the present disclosure.

FIG. 7 illustrates a schematic diagram of a computer readable storage medium 300 according to an embodiment of the present disclosure.

As shown in FIG. 7, the computer readable storage medium 300 has stored thereon computer readable commands 301. When the computer readable commands 301 are executed by a processor, the method according to the embodiments of the present disclosure described with reference to the above figures can be performed. The computer-readable storage medium in the embodiments of the present disclosure can be a volatile memory or a nonvolatile memory or can include both volatile and nonvolatile memories. The non-volatile memory can be a read-only memory (ROM), a programmable read-only memory (PROM), an erasable programmable read-only memory (EPROM), an electrically erasable programmable read-only memory (EEPROM), or a flash memory. The volatile memory can be random access memory (RAM), which acts as external cache memory. By way of illustration and not limitation, many forms of RAM are available such as static random-access memory (SRAM), dynamic random-access memory (DRAM), synchronous dynamic random-access memory (SDRAM), double data rate synchronous dynamic random-access memory (DDRSDRAM), enhanced synchronous dynamic random-access memory (ESDRAM), synchronous link dynamic random-access memory (SLDRAM), and direct Rambus random-access memory (DR RAM). It should be noted that the memory of the methods described herein is intended to include, without being limited to, these and any other suitable types of memory.

It is noted that the flowchart and block diagrams in the drawings illustrate the architecture, functionality, and operation of possible implementations of systems, methods, and computer program products according to various embodiments of the present disclosure. In this regard, each block in the flowchart or block diagrams can represent a module, segment, or portion of code, which includes at least one executable command for implementing the specified logical function(s). It should also be noted that, in some alternative implementations, the functions noted in the block can occur out of the order noted in the drawings. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or operations or combinations of special purpose hardware and computer commands.

In general, the various example embodiments of the disclosure can be implemented in hardware or special purpose circuits, software, firmware, logic or any combination thereof. Certain aspects can be implemented in hardware, while other aspects can be implemented in firmware or software which may be executed by a controller, microprocessor or other computing device. While aspects of embodiments of the present disclosure are illustrated or described as block diagrams, flow charts, or using some other graphical representation, it is understood that the blocks, apparatus, systems, techniques or methods described herein can be implemented in, as non-limiting examples, hardware, software, firmware, special purpose circuits or logic, general purpose hardware or controller or other computing devices, or some combination thereof.

The example embodiments of the present disclosure described in detail above are merely illustrative, and are not limiting. It will be understood by those skilled in the art that various modifications and combinations of these embodiments or features thereof can be made without departing from the principles of the present disclosure, such modifications shall fall within the scope of the present disclosure.

What is claimed is:

1. A differential protection method for a protection section of a power system, a first current transformer and a second current transformer are respectively connected to each end of the protection section, the differential protection method comprises:

continuously obtaining a first secondary current value of the first current transformer and a second secondary current value of the second current transformer;

determining a differential current value and a braking current value based on the first secondary current value and the second secondary current value;

starting a judgment time window in response to an occurrence of a fault in the power system; and in response to the differential current value and the braking current value satisfying an in-section fault condition during the judgment time window, judging the fault as an in-section fault, otherwise judging the fault as a fault to be determined, wherein the in-section fault condition is that an absolute value of the differential current value is consistently greater than the absolute value of the braking current value, and the absolute value of the differential current value is monotonically increasing.

2. The differential protection method according to claim 1, wherein the judgment time window lasts from 3 ms to 5 ms.

3. The differential protection method according to claim 1, wherein in response to the fault being judged to be the in-section fault, controlling circuit breakers arranged at both ends of the protection section to perform a protection action such that the protection section is disconnected from the power system.

4. The differential protection method according to claim 1, wherein in response to the fault being judged to be the fault to be determined, blocking a protection action in a predetermined period such that the protection section is not disconnected from the power system in the predetermined period.

5. The differential protection method according to claim 4, wherein performing a subsequent fault judgment in the predetermined period, and upon expiration of the predetermined period, determining whether to allow a protection action, wherein the subsequent fault judgment comprises determining a type of the fault using harmonic braking.

6. A relay protection device capable of providing differential protection for a protection section of a power system, the protection section comprises a first current transformer and a second current transformer connected at each end of the protection section, the relay protection device comprises:

a current obtaining module for continuously obtaining a first secondary current value of the first current transformer and a second secondary current value of the second current transformer;

a determination module for determining a differential current value and a braking current value based on the first secondary current value and the second secondary current value; and a judgement module for starting a judgment time window in response to an occurrence of a fault in the power system, and in response to the differential current value and the braking current value satisfying an in-section fault condition during the judgment time window, judging the fault as an in-section fault, otherwise judging the fault as a fault to be determined;

wherein the in-section fault condition is that an absolute value of the differential current value is consistently greater than the absolute value of the braking current value, and the absolute value of the differential current value is monotonically increasing.

7. The relay protection device according to claim 6, further comprising:

a control module, wherein:

in response to the fault being judged to be the in-section fault, the control module is configured to control circuit breakers arranged at both ends of the protection section to perform a protection action such that the protection section is disconnected from the power system; and in response to the fault being judged to be the fault to be determined, the control module is configured to block a protection action in a predetermined period such that the protection section is not disconnected from the power system in the predetermined period.

8. The relay protection device according to claim 7, wherein in response to the fault being judged as the fault to be determined, the judgment module performs a subsequent fault judgment in the predetermined period, and determines whether to allow a protection action upon expiration of the predetermined period, wherein the subsequent fault judgment comprises determining a type of the fault using harmonic braking.

9. An apparatus for differential protection of a protection section of a power system, the apparatus comprising:

at least one processor; and at least one memory in which is stored an executable program which, when the executable program is executed by the at least one processor, performs a method for a protection section of a power system, a first current transformer and a second current transformer are respectively connected to each end of the protection section, the method comprises:

continuously obtaining a first secondary current value of the first current transformer and a second secondary current value of the second current transformer;

determining a differential current value and a braking current value based on the first secondary current value and the second secondary current value;

starting a judgment time window in response to an occurrence of a fault in the power system; and in response to the differential current value and the braking current value satisfying an in-section fault condition during the judgment time window, judging the fault as an in-section fault, otherwise judging the fault as a fault to be determined, wherein the in-section fault condition is that an absolute value of the differential current value is consistently greater than the absolute value of the braking current value, and the absolute value of the differential current value is monotonically increasing.

* * * * *